Dec. 11, 1956     J. J. GOETT     2,773,823
SAFETY DEVICE FOR A NEUTRONIC REACTOR
Filed May 22, 1945     2 Sheets-Sheet 2

Witnesses:
Hubert E. Metcalf
William J. Ruano

Inventor:
John J. Goett.
By:
Robert A. Levander
Attorney

United States Patent Office 2,773,823
Patented Dec. 11, 1956

2,773,823

SAFETY DEVICE FOR A NEUTRONIC REACTOR

John J. Goett, Chicago, Ill., assignor to the United States of America as represented by the United States Atomic Energy Commission Application May 22, 1945, Serial No. 595,189

1 Claim. (Cl. 204—193)

The present invention relates to the subject of neutronics, and to a suitably cooled neutron chain reacting system that will develop a self-sustaining neutron chain reaction of high neutron density. More specifically, the present invention is directed to an efficient, reliable, quick acting safety control means for effecting substantially instantaneous stoppage of a neutronic chain reaction in the event of emergency, such as an abnormal increase in the neutron density in a neutronic reactor, particularly in a fluid cooled reactor.

In neutronic reactors a neutron fissionable isotope, such as $U^{233}$, $U^{235}$, or $94^{239}$, or mixtures thereof, is subjected to fission by absorption of neutrons, and a self-sustaining chain reaction is established by the neutrons evolved by the fission. In general, such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in the copending application of Enrico Fermi and Leo Szilard, Serial No. 568,904, filed December 19, 1944, now Patent No. 2,708,656, dated May 17, 1955.

A common method for regulating or controlling a self-sustaining neutron chain reacting system is that of moving control rods of neutron absorbing material into and out the neutronic reacting system, either manually, or automatically in response to the neutron density developed in the system. Likewise, a common method for effecting sudden stoppage of the neutron reaction in the event of failure of operation of the control rods is that of moving one or a plurality of neutron absorbing safety rods into the reactor, either manually, or by a gravity operated mechanism responsive to the neutron density developed in the neutronic reactor. Both manual and gravity operation of such safety rods have the disadvantage of being too slow for use in certain neutronic reactors since the neutron density may increase exponentially with respect to time and may double under certain circumstances in one-thousandth of a second. Hence, in the operation of certain high powered neutronic reactors, any accidental exponential rise, if not checked substantially instantaneously by the safety operating mechanism, may in a matter of seconds develop such high power that heat will be developed at a greater rate than it can be dissipated by the cooling system, resulting in a very dangerous operating condition of the neutronic reactor that may have disastrous results.

Hence, an object of the present invention is to provide a safety control device that is devoid of the above-mentioned disadvantages and that will operate substantially instantaneously to project a plurality of bodies of neutron absorbing material into the neutronic reactor in the event of an emergency, such as in the case of an abnormal rise in neutron reproduction ratio of the neutron chain reacting system, so as to immediately stop the chain reaction.

Another object of the present invention is to provide a safety control device that is electrically responsive to the attainment of a predetermined abnormal value of neutron density of the neutronic reactor and that will project a plurality of bodies of neutron absorbing material into the interior region of the neutronic reactor by means of centrifugal force to effect a substantially instantaneous reduction of the neutron reproduction ratio of the system to below unity, thus stopping the neutron chain reaction.

Other objects and advantages will become more apparent from a study of the following description taken in conjunction with the drawings in which.

Figure 1:
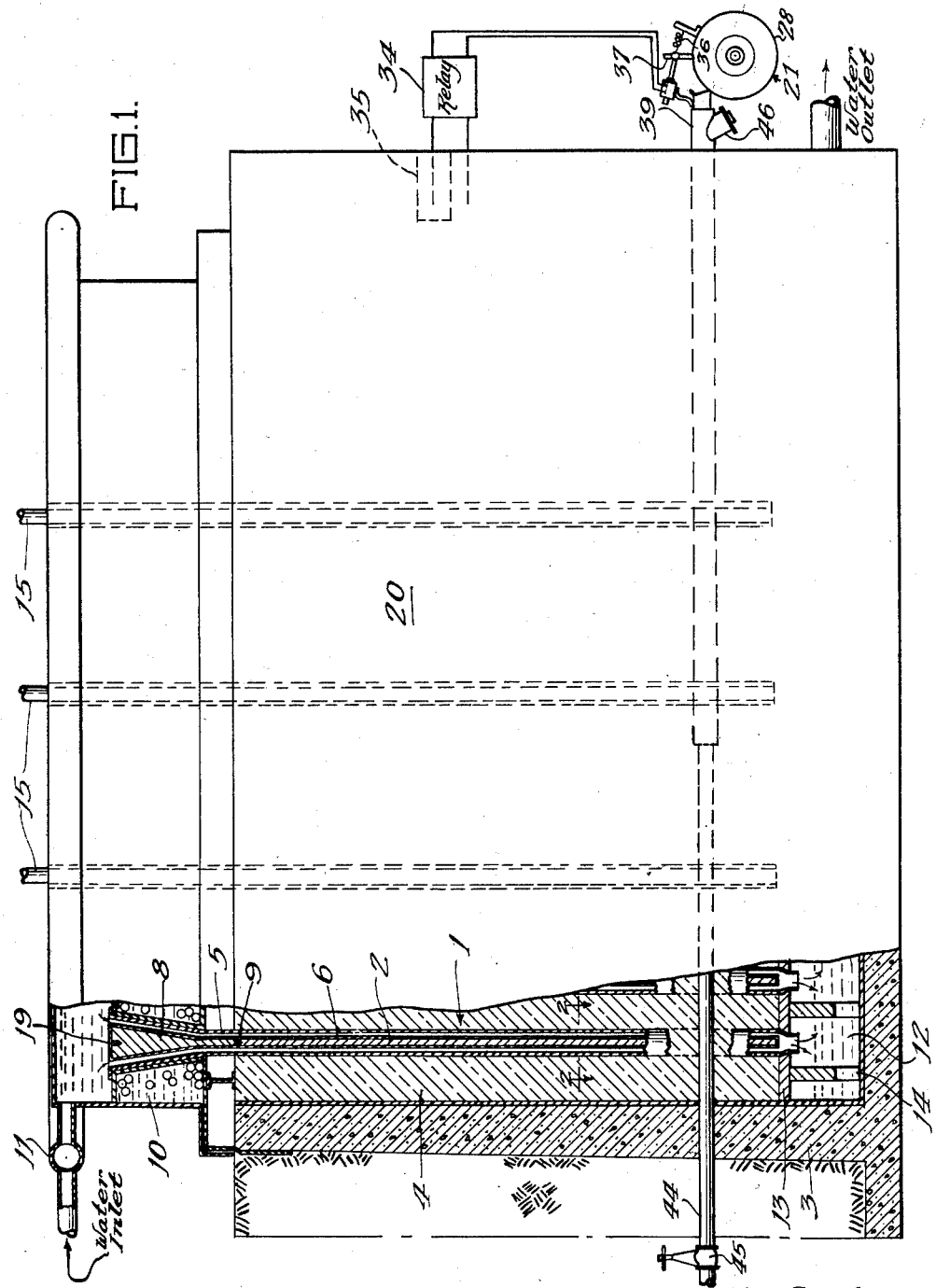
Fig. 1 is an elevational view, partly in section, of a neutronic reactor embodying a safety control mechanism following the teachings of the present invention.
Figure 2:
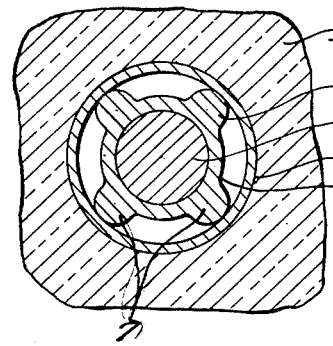
Fig. 2 is an enlarged sectional view taken on the line 2—2 of Fig. 1.

Referring more specifically to Figs. 1 and 2, numeral 1 denotes a massive graphite cylinder built up from a plurality of graphite bricks and serving as the neutron slowing material or moderator of a neutronic reactor system 20. A plurality of uranium rods 2 is suspended in the graphite cylinder 1 substantially equally spaced across substantially the entire radial area of the massive cylinder 1. An operative neutronic reactor is provided if, for example, the cylinder 1 is approximately 5.5 meters high and 3.8 meters in radius, and if about 68 tons of uranium are used in the rods 2, each having a radius of about 1.6 centimeters and a height of about 5.5 meters, there being a total of about 850 rods 2. The rods 2 may be arranged approximately 25 centimeters apart. About 400 tons of graphite are contained in the massive cylinder 1. The neutronic reactor rests on a concrete floor and is surrounded by a concrete wall 3, that completely encircles the reactor circumferentially. The active part of the neutronic reactor comprises the vertically disposed uranium rods 2 surrounded by the moderator 1, including a graphite annulus 4 that serves as a neutronic reflector and that also may be built up of a plurality of graphite bricks.

Each of the uranium rods 2 is disposed in a tube 5 of a suitable material that has a low absorption for neutrons and that withstands corrosion to a satisfactory degree, such as, for example, aluminum or beryllium. The diameter of rod 2 is less than that of tube 5 so as to provide a restricted annular passage therebetween for the circulation of a coolant, such as, ordinary water, the path of which is indicated by arrows. A coating or sheathing 6 of aluminum, for example, is provided on the outer surface of rod 2 to prevent the coolant from coming into direct contact with the uranium and causing corrosion and formation of oxides that will gradually be carried away by the water. The coating 6 thus prevents disintegration of uranium rods 2 due to the reaction of the water with the uranium at high neutron densities. The annular space for the flow of cooling water exteriorly of rod 2 is divided into flow channels by a plurality of longitudinal ribs 7 formed preferably integral with coating 6, as shown in Fig. 2. A member 8 of material other than uranium is threadedly connected at 9 to the rod 2 and is enclosed in coating 6. The member 8 has a threaded well 19 in the top to facilitate removal and insertion of rod 2.

A top shield 10 of any suitable type, such as one containing water and lead shot, is provided for preventing escape of gamma rays and other penetrating radiations that are developed in the neutronic reactor. Cooling water is introduced from a water inlet through a circular header 11, and after the water passes along the outer surfaces of the coated uranium rods 2, it flows into a bottom chamber or header 12, and thence exteriorly of the system through a water outlet, as shown. The water can then be cooled by any suitable heat exchanger (not shown) or, if desired, a continous supply of fresh water may be introduced at the inlet, such as, for example, from a nearby stream, river or water supply, the water outlet being emptied into any suitable sewage system, or recirculated if desired. Plate 13 supported by a plurality of pillars 14 forms a bottom support for the uranium rods 2 and has a plurality of holes which coincide with the lower openings of tubes 5.

A plurality of neutron absorbing control rods 15 made of cadmium, for example, are provided at the top of the reactor. They may be moved vertically into the interior of the neutronic reactor, that is, between rows of the uranium rods 2 and through the graphite 1, preferably near the center of the reactor, and may be controlled either manually or automatically by any suitable motive means (not shown). They may be automatically controlled by the neutron density of the reactor, such as by means of ion chambers disposed adjacent the periphery of reflector 4 (not shown). In other words, upon attainment of a predetermined value of neutron density in the reactor, a motive means, such as a motor, may be actuated so as to drive the control rods 15 downwardly into the reactor to reduce the neutron density, and upon a predetermined decrease of neutron density, will drive them upwardly out of the reactor, thereby maintaining a substantially constant neutron density during normal operation of the reactor.

However, if for any reason such neutron absorbing rods 15 or other equivalent devices fail to function adequately, the neutron density in the system can rise exponentially and under such circumstances the activity of the neutronic reactor may rise rapidly.

In a neutronic reactor of the type described above where cooling water is passed exteriorly of the uranium rods through narrowly constricted annuli, the tendency of any abnormal rise in neutron density will be to cause high heating and vaporization of the water surrounding the uranium tubes inasmuch as the thickness of each water annulus is only about 2 millimeters to prevent excessive neutron absorption in the water. Since the presence of the water inherently has the effect of lowering the neutron density and neutron reproduction ratio because water is a neutron absorbing material, it will become readily apparent that as soon as the water is vaporized into steam, less dense than the original water, or is blown out of the annular restriction, the neutron density and reproduction ratio will increase rapidly.

In addition, even if the control rods are functioning properly, any interruption or reduction of water flow in any tube, due perhaps to some foreign body entering the water annulus, will cause steam to form locally adjacent the reduction. Under these conditions the local rate of fission and neutron emission will increase, causing additional fissions and neutron emission in neighboring tubes tending to vaporize the water in these neighboring tubes. This abnormal condition, known as "boiling disease," will spread progressively and rapidly from the source of the disturbance until the entire reactor is involved, unless checked rapidly. For safety of operation of fluid cooled reactors, the reaction must be stopped when required in less than ½ second to prevent spread of the boiling.

In accordance with the present invention, there is provided a means for substantially instantaneously introducing neutron absorbing bodies into the reactor immediately following such inadequacy or failure of operation of the neutron absorbing rods 15. These neutron absorbing bodies are sufficiently large in number so as to reduce the neutron reproduction ratio to some value well below unity in a small fraction of a second.

Figure 3:
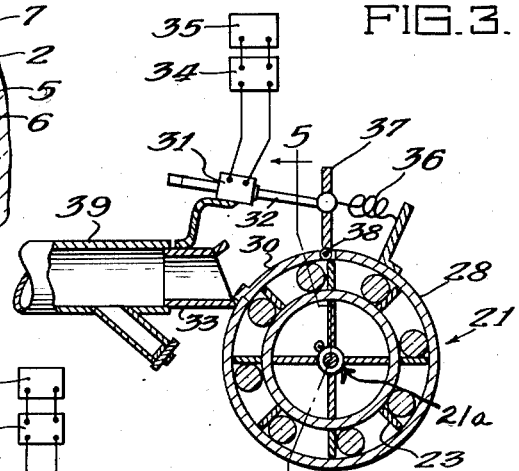
Fig. 3 is an enlarged sectional view of a portion of the reactor safety device taken along the line 3—3 of Fig. 5, the gate thereof being in closed position.
Figure 4:
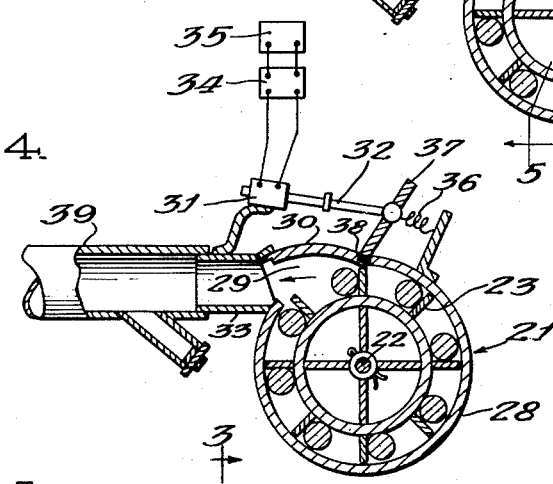
Fig. 4 is a view similar to that of Fig. 3, the gate being shown open for discharge of control balls into the reactor.
Figure 5:
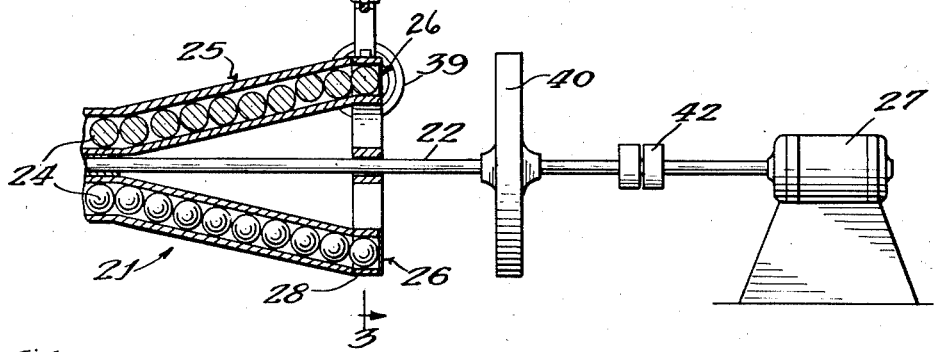
Fig. 5 is an enlarged sectional view taken on the line 5—5 of Fig. 3, a portion thereof being in elevation.

Figs. 3–5 are views of a safety controlled mechanism embodying the teaching of the present invention for projecting a plurality of bodies of neutron absorbing material into the reactor in the event of an emergency by means of centrifugal force, such as an abnormal increase in the value of or rate of rise of the neutron density or neutron reproduction ratio of the chain reacting system. A conical cage or wheel 21 is secured by a cotterpin 21a, or the like, to a driven shaft 22, and has a plurality, for Example 8, substantially radially arranged blades 23, each of which propels a plurality of balls 24 of neutron absorbing material such as, cadmium, boron, silver, or the like, or suitable compounds thereof. The wheel 21 includes a storage portion 25 and a head 26, balls 24 being carried in each. The storage portion 25 has a smooth conical interior. A fixed ring 28 is supported in any suitable manner, as by a bracket (not shown), concentrically of the head 26, and cooperates therewith to form a race or track for the end balls 24. During normal operation of the neutronic reactor the neutron absorbing balls 24 remain in wheel 21, and are continuously rotated by a motor 27 to store kinetic energy, shaft 22 being connected to the motor 27. A gate member 30 normally closes an opening 29 in the ring 28 and is maintained in the closed position shown in Fig. 3 by means of the electromagnetic attraction of a solenoid 31 that is normally energized while the neutron density is at a normal value. Solenoid 31 is maintained in an energized condition by means of a relay, including an amplifier, schematically illustrated by the block diagram 34, which in turn is controlled by an ion chamber of any suitable type, such as one containing $BF_3$ as the ionizing medium, located, for example, near the periphery of reflector 4 of the neutronic reactor, and illustrated by block diagram 35. Since relay 34 and ion chamber 35 may be of any well-known type and since their specific details form no part of the present invention, further illustration is deemed to be unnecessary. Balls 24 are thus confined to the wheel 21 and are prevented by closed gate member 30 from being discharged into an adjacent discharge tube 33.

Upon attainment of a predetermined value, or rate of change of neutron density, such as will be detected by a predetermined ionization in ion chamber 35 effecting operation of relay 34, solenoid 31 becomes deenergized, allowing armature 32 to be moved (to the right, Figs. 3 and 4) by the force of a heavy tension spring 36, normally maintained under tension and pivoting member 37 that is pivotally connected to armature 32 and secured to the gate member 30. Gate member 30 pivots to the position shown in Fig. 4 rotating with member 37 about a hinge 38. With the gate member 37 thus open, the balls 24 are projected by centrifugal force into and through the discharge tube 33, and through a telescoping tube 39. Tube 39 projects into the central portion of the neutronic reactor, in the space between two centrally located adjoining rows of uranium-containing rods 2 (see Fig. 1). Thermal neutrons are absorbed rapidly by balls 24 effecting reduction of the neutron density, thereby reducing the neutron reproduction ratio to below unity, and effecting stoppage of the neutron chain reaction. By means of a hopper (not shown) or other suitable storage means, a reserve supply of balls 24 may be maintained at all times and fed into the left portion of wheel 21 (Fig. 5) as the balls 24 are projected therefrom.

In order to provide a suitable cushioning effect to the balls 24 as they are projected into the neutronic reactor by centrifugal force, the inner end of tube 39 is connected to a smaller tube 44 extending through the reactor, kept closed by valve 45 so as to create an air cushion in tubes 39 and 44 (Fig. 1). Tube 44 is of smaller dimension than balls 24 and can also be used to force balls 24 out of tube 39 by providing pressure therein by a pump (not shown). In this manner it is possible, after stoppage of the chain reaction, to effect removal of the balls 24 from the interior of the neutronic reactor by forcing them to the right of pipe 39 so they may be collected by opening a tap or outlet 46 in pipe 39 when the emergency no longer exists and before restarting the neutronic reactor.

A fly wheel 40 is rigidly secured to drive shaft 22 to keep the turbine-like wheel 21 moving at high speed in the event of an electric power failure at the time of emergency. The torque of the driving motor 27 is applied to the fly wheel 40 through a free wheeling or one-way clutch 42, or an equivalent device, so that the motor exerts no drag upon the system in the event of such electric power failure. In fact, if the solenoid 31 or relay 34 is energized from the same power source as the motor, the gate 30 will be opened on a failure of power, so that if the safety device becomes disabled by such failure, it is immediately applied to stop the reaction.

It will be seen, therefore, that there has been provided a safety control mechanism responsive to an abnormal increase or rate of increase of neutron density in a neutronic reactor, for projecting, by stored centrifugal force, a plurality of bodies of neutron absorbing material into the neutronic reactor to stop the chain reaction. While there has been described such neutron absorbing bodies as being ball-shaped, it will be apparent that other shapes and other materials than those described may be used instead. Furthermore, while there has been described a turbine-like wheel 21 for imparting centrifugal force to such neutron absorbing bodies, it will be apparent that other means for storing energy by centrifugal force in such bodies may be used instead. While the centrifugally operated safety control mechanism of the present invention has been described as applied to a graphite moderated neutronic reactor, it should be noted that such safety mechanism is equally applicable to other types of neutronic reactors such as, for example, the type embodying a plurality of uranium containing rods supported in a liquid moderator, such as heavy water, or a type of neutronic reactor made up of a slurry, that is, a body of liquid moderator, such as, for example, heavy water having suspended therein fine particles of fissionable material such as, for example, uranium oxide particles. In fact, the safety-controlled mechanism following the teachings of the present invention is applicable to any type of neutronic reactor, and is particularly valuable in fluid cooled-reactors.

While the theory of nuclear fission of uranium as set forth herein is based on the best presently known experimental evidence, the present invention is not to be bound thereby, since additional experimental evidence later discovered may modify the theory disclosed. Any such modifications of theory, however, will in no way affect the results to be obtained in the practice of the invention herein described and claimed.

It would be noted that the system described above is merely exemplary, and not limiting insofar as the present invention is concerned, since it will be apparent that other similar systems will be sugegsted to those skilled in the art. Hence, the present invention should be limited only insofar as set forth in the following claim.

What is claimed is:

A safety device for a neutronic reactor comprising a projecting device for bodies comprising a conical rotary wheel having eight substantially radial blades, a head at the large end, and a storage portion provided with a smooth conical interior; means for rotating the wheel; a stationary ring surrounding the wheel adjacent the head and being provided with a gate for discharging from the wheel bodies propelled therein by the blades; and means responsive to the neutron density within the reactor for opening the gate of the projecting device when the neutron density exceeds a predetermined level.

References Cited in the file of this patent

UNITED STATES PATENTS

| | | |
|---|---|---|
| 789,677 | Spear | May 9, 1905 |
| 791,685 | Fowler | June 6, 1905 |
| 990,593 | Ringland et al. | Apr. 25, 1911 |
| 1,196,151 | Reynolds | Aug. 26, 1916 |
| 1,313,038 | Adsit | Aug. 12, 1919 |
| 2,205,494 | Schindler | June 25, 1940 |
| 2,206,634 | Fermi et al. | July 2, 1940 |
| 2,391,636 | McArthur | Dec. 25, 1945 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |